US011883981B2

(12) United States Patent
Menzel et al.

(10) Patent No.: US 11,883,981 B2
(45) Date of Patent: Jan. 30, 2024

(54) DEVICE FOR PRODUCING CERAMIC PARTS

(71) Applicant: DORST Technologies GmbH & Co. KG, Kochel am See (DE)

(72) Inventors: Roland Menzel, Kochel am See (DE); Sebastian Bauer, Wackersberg (DE); Max Hälterlein, Wielenbach (DE)

(73) Assignee: DORST Technologies GmbH & Co. KG, Kochel am See (DE)

( * ) Notice: Subject to any disclaimer, the term of this patent is extended or adjusted under 35 U.S.C. 154(b) by 509 days.

(21) Appl. No.: 16/331,737

(22) PCT Filed: Oct. 13, 2017

(86) PCT No.: PCT/EP2017/076222
§ 371 (c)(1),
(2) Date: Mar. 8, 2019

(87) PCT Pub. No.: WO2018/069513
PCT Pub. Date: Apr. 19, 2018

(65) Prior Publication Data

US 2021/0299908 A1 Sep. 30, 2021

(30) Foreign Application Priority Data

Oct. 14, 2016 (DE) ......................... 102016119673.8

(51) Int. Cl.
*B29B 7/46* (2006.01)
*B28B 7/36* (2006.01)
(Continued)

(52) U.S. Cl.
CPC .............. *B28B 7/368* (2013.01); *B28B 1/261* (2013.01); *B28B 7/46* (2013.01); *B30B 9/262* (2013.01); *B30B 9/28* (2013.01)

(58) Field of Classification Search
CPC ........... B28B 7/368; B28B 1/261; B28B 7/46; B30B 9/262; B30B 9/28
See application file for complete search history.

(56) References Cited

U.S. PATENT DOCUMENTS 4,664,610 A * 5/1987 Aoyama ................ B28B 1/261 425/84
4,798,525 A * 1/1989 Sato ....................... B28B 1/266 425/84
(Continued)

FOREIGN PATENT DOCUMENTS

CN 203697208 U 7/2014
DE 2011909 A1 11/1971
(Continued)

OTHER PUBLICATIONS

Chinese Office Action for Chinese Application No. 2017800555952, dated Jun. 17, 2020 in 16 pages. (English translation included).
(Continued)

*Primary Examiner* — Jacob T Minskey
*Assistant Examiner* — Adrien J Bernard
(74) *Attorney, Agent, or Firm* — Knobbe, Martens, Olson & Bear, LLP

(57) ABSTRACT

A slip casting mold is useful for producing a ceramic die cast part. The slip casting mold includes a first mold part with a first main part and a first filtration layer and comprising at least one second mold part with a second main part and a second filtration layer. The first main part is equipped with at least one first dewatering channel with at least one dewatering channel end that opens into a second dewatering channel within the second mold part or into a dewatering channel within an additional dewatering body in a casting position.

13 Claims, 2 Drawing Sheets

(51) Int. Cl.

| | |
|---|---|
| ***B28B 1/26*** | (2006.01) |
| ***B28B 7/46*** | (2006.01) |
| ***B30B 9/26*** | (2006.01) |
| ***B30B 9/28*** | (2006.01) |

(56) References Cited

U.S. PATENT DOCUMENTS

| | | | | |
|---|---|---|---|---|
| 6,752,910 | B2 * | 6/2004 | Sato | D21J 3/10 425/412 |
| 2006/0231980 | A1 * | 10/2006 | Kubota | B28B 13/0275 264/319 |

FOREIGN PATENT DOCUMENTS

| | | | | |
|---|---|---|---|---|
| DE | 3319012 | A1 | 12/1983 | |
| DE | 3502348 | A1 | 7/1986 | |
| DE | 4123700 | A1 | 1/1992 | |
| FR | 2846271 | B1 | 4/2004 | |
| JP | S5014507 | * | 11/1975 | B28B 3/00 |
| JP | S50140507 | A | 11/1975 | |
| JP | S5445261 | U | 3/1979 | |
| JP | 03290203 | A | 12/1991 | |

OTHER PUBLICATIONS

Search Report for German Priority Application No. 10 2016 119 673.8, dated Sep. 14, 2017, in 11 pages (English translation included).

International Search Report for PCT Application No. PCT/EP2017/076222, dated Jan. 24, 2018 in 4 pages.

* cited by examiner

DEVICE FOR PRODUCING CERAMIC PARTS

CROSS-REFERENCE TO RELATED APPLICATIONS

This application is the U.S. National Phase under 35. U.S.C. § 371 of International Application PCT/EP2017/076222, filed Oct. 13, 2017, which claims priority to German Patent Application No. 10 2016 119 673.8, filed Oct. 14, 2016. The disclosures of the above-described applications are hereby incorporated by reference in their entirety.

DESCRIPTION

Field of the Invention

The invention relates to a casting mold, in particular a slip casting mold, according to claim 1, a casting device, a method for dewatering a cast part and a method for producing a cast part.

Background of the Invention

The production of cast parts, in particular ceramic cast parts, is usually carried out using at least two mold parts. During the production of ceramics, slurry is brought into these mold parts. Slurry is a liquid (pulpy to viscous) mass (water-mineral mixture) for the production of ceramic products. The slurry is pressurized and pressed into the mold so that water is pressed out of the slurry. The mold is held together by clamping forces (e.g. hydraulic or pneumatic or similar). The water escapes through the slurry pressure from the mold and a so-called green compact is formed. For demolding of the green compact (the body), the mold parts must be opened so that the green compact can be demolded. The mold parts are then usually cleaned (e.g. with water and/or air). The mold parts can then be closed again so that a new casting cycle can begin.

DE 37 26 383 C2 describes a method and a device for the slip casting of ceramic parts. The corresponding device has several (specifically four) mold parts in which communicating channels are arranged, which are connected with a flexible pressure relief hose. The mold parts are made of a porous material such as gypsum. The process of dewatering is perceived as comparatively complex, especially time-consuming.

Furthermore, it is known that mold parts are formed to have a base body on which a filtration layer is applied, through which the water is drained during dewatering. Further below, an example of this type of casting mold design is explained using FIG. 1. Usually, the water is drained off through a connection to the respective base body. Since the mold parts move relative to each other (e.g. during product removal, cleaning, etc.), the water is discharged via (flexible) hoses. A fast and flexible further transport of the finished green compact is therefore only possible to a limited extent. Overall, the production of the green compact is therefore comparatively complex and not very flexible.

SUMMARY OF THE INVENTION

It is therefore the object of the invention to propose a casting mold, in particular a slip casting mold, for the production of a cast part, in particular a ceramic die-cast part, which enables effective drainage and, in particular, flexible further transport of the cast part. Furthermore, a corresponding casting device, a corresponding method for dewatering a cast part and a corresponding method for producing a cast part shall be proposed.

This object is solved by the features of claim 1.

In particular, the object is solved by a casting mold, in particular a slip casting mold, for producing a cast part, in particular a ceramic die-cast part, comprising at least one first mold part having a first base body and a first filtration layer and at least one second mold part having a second base body and a second filtration layer, wherein at least one first dewatering channel is provided in the first base body with at least one dewatering channel end, which, in a casting position, opens into a dewatering channel within the second mold part or into a dewatering channel within an additional dewatering body.

A core aspect of the invention lies in the use of mold parts which are basically constructed in two parts (namely with a base body and a filtration layer) and which, in the case of the first mold part, discharge the water not via a connection with a corresponding drain, but via the second mold part (or an additional dewatering body). This allows the first mold part to move freely after dewatering (as it is not connected to a drain, such as a hose) and can be quickly transported further. Nevertheless, the cast part is drained effectively and quickly. In particular, it is also possible to remove the cast part with a robot (together with the first mold part). The robot can then flexibly position the cast part at a suitable location for further processing. For example, the cast part can also be moved sideways and does not have to be moved in the opposite direction to the second mold part (as is usual in the prior art). A central idea is, therefore, that the dewatering channel of the first mold part opens (directly) into a dewatering channel of the second mold part or into a dewatering channel of an additional dewatering body. In particular, if a dewatering channel of the second mold part is used, a structure for draining water from a dewatering channel within the first mold part is not required.

An (additional) dewatering body is, in particular, a body that is rigid (and possibly without open pores). In the casting position, the dewatering body (just like the second base body) can be in direct contact with the first base body and/or (further) away from the first base body in a demolding position (in particular open mold parts), e.g. at least substantially as far away as the second base body.

The first and/or second base bodies are (preferably) formed without pores or at least without open pores. The (first and/or second) filtration layer may have an (at least substantially) constant thickness. The (first and/or second) base body can contain at least one recess and/or at least one projection for fixing the shape of the cast part.

Preferably, a dewatering channel end filter device, in particular a dewatering channel end filtration layer, is provided at the dewatering channel end. Alternatively or additionally, a dewatering channel end valve device can be provided. This allows a fluid resistance at the dewatering channel end to be approximated or adjusted to a fluid resistance of the first filtration layer. If, for example, a fluid (e.g. water or air) is pressed into the first dewatering channel or sucked off from there, this also affects the first filtration layer, since the fluid is not (exclusively) pressed over the end of the dewatering channel or sucked off from there. Thus, the dewatering process can also be influenced (controlled) by changes in the pressure in the dewatering channel. This increases the efficiency of the dewatering process.

The first dewatering channel has at least one fluid supply and/or discharge end through which a fluid (e.g. air or water) can be supplied and/or discharged. This fluid supply and/or discharge end is preferably (in the casting position) not in contact with the second mold part so that it is accessible from outside the mold (e.g. by a robot). Specifically, the dewatering channel may have (at least or exactly) three ends, namely the dewatering channel end, the fluid supply and/or discharge end, and the end in contact with the first filtration layer. A corresponding branch (at least one thereof) is provided for this purpose. Via the fluid supply and/or discharge end, a pressure applied to the first filtration layer at the corresponding end of the fluid channel can be increased and/or decreased so that the dewatering process can be promoted and/or the removal of the finished green compact is facilitated via the first mold part (e.g. via a robot). This can be done, for example, by sucking the first part of the mold off with the green compact and then increasing the pressure to deposit the green compact at a different location (e.g. conveyor belt).

A valve is preferably assigned to the fluid supply and/or discharge end so that the fluid supply and/or discharge end can optionally be opened or closed. This valve can preferably be actuated by a pick-up device (such as a robot). This makes it easier to dewater and move the cast part.

Preferably the first dewatering channel is adjacent to the first filtration layer (without penetrating it). Alternatively, the first dewatering channel can at least partially penetrate the first filtration layer.

The (respective) second dewatering channel within the second mold part can penetrate the second mold part without being in contact with the second filtration layer. Alternatively, the second dewatering channel can also be in contact with the second filtration layer.

In general, at least two (or at least three or at least four) first dewatering channels and/or at least two (or at least three or at least four) second dewatering channels may be provided. For the second dewatering channels, at least one (or at least two or at least three) dewatering channels may not be in contact with the second filtration layer and/or at least one (or at least two or at least three) dewatering channels may be in contact with the second filtration layer.

A seal (ring seal) is preferably provided in an area around the end of the dewatering channel.

Preferably, a dewatering channel start of the second dewatering channel in the casting position is in direct connection with the dewatering channel end of the first dewatering channel.

Preferably, a cross-sectional area of one (the) dewatering channel start of the second dewatering channel is at least approximately (optionally +/−40%, in particular +/−10%) as large as a cross-sectional area of the dewatering channel end of the first dewatering channel.

In embodiments, a length of the first and/or second dewatering channel is at least 2 times, preferably at least 4 times, as large as an (average) diameter.

A (the) diameter of the first and/or second dewatering channel is preferably constant (over the respective length of the first and/or second dewatering channel).

A cross-section of the first and/or second dewatering channel is preferably round and/or oval and/or polygonal (at least in sections, possibly over the entire length), in particular rectangular.

The above-mentioned object is further solved by a casting device, in particular a slip casting device, comprising at least one casting mold, in particular a slip casting mold of the type described above, for producing a cast part, in particular a ceramic die-cast part.

The casting device, in particular the slip casting device, preferably comprises a removal device, in particular a robot (in order to remove the first mold part together with the cast part from the second mold part and to remove the cast part therewith). In particular, the removal device is designed so that the cast part can be removed laterally (i.e. in a direction which deviates from a pressing direction (e.g. by an angle of at least 10 degrees or at least 30 degrees or at least 45 degrees or at least 60 degrees)). The pressing direction is defined by the pressing of the first and second mold part against each other. This allows the cast part to be picked up quickly and variably and positioned elsewhere.

Preferably, at least one fluid supply and/or discharge device is provided in order to press fluid (in particular air and/or water and/or slurry) in the direction of a mold cavity or to suck it off from there. This allows the drainage and/or the receiving and other positioning of the cast part to be improved.

The above-mentioned object is in particular further solved by a method for dewatering a cast part, in particular a ceramic die-cast part, in a casting mold, in particular of the type described above, wherein the casting mold has at least one first mold part with a base body and a first filtration layer and at least one second mold part with a second base body and a second filtration layer, wherein liquid is discharged for dewatering through the base body and from there through the second base body and/or through an additional dewatering body. Preferably, the first and second mold parts are pressed against each other during dewatering.

During dewatering, a negative or positive pressure can be built up in at least one first dewatering channel of the first mold part. Alternatively or additionally, a negative or positive pressure can be built up in at least one second dewatering channel of the second mold part during dewatering. For example, a positive pressure can be built up in one of the first dewatering channels and a negative pressure in another of the first dewatering channels so that the liquid in the filtration layer is pressed from one dewatering channel to the other. Alternatively or additionally, a positive pressure is built up in one of the second dewatering channels and/or a negative pressure is built up in another of the second dewatering channels so that water from the first and/or second filtration layer is conveyed from the first dewatering channel to the second dewatering channel and can thus be effectively removed. All in all, this enables efficient dewatering.

The above-mentioned task is further solved in particular by a method for producing a cast part, in particular a ceramic die-cast part, using a casting mold, in particular of the type described above, comprising the steps:

Filling of a mass to be cast into a cavity;

Dewatering according to the method described above, and

Removing the cast part from the mold.

The cast part is preferably removed (or withdrawn) from the side (in particular by a robot). In principle, however, the direction of withdrawal is arbitrary.

The above-mentioned object is further solved, in particular, by the use of a casting mold, in particular a slip casting mold of the type described above, and/or a casting device, in particular a slip casting device of the type described above, for the production of a cast part, in particular a die-cast slip part.

Further embodiments result from the sub claims.

BRIEF DESCRIPTION OF THE DRAWINGS

In the following, the invention is described using a comparison example and an embodiment example, which are explained in more detail using the illustrations, wherein.

In the following description, the same reference numerals are used for identical and equivalent parts.

DETAILED DESCRIPTION OF THE PREFERRED EMBODIMENTS

Figure 1:
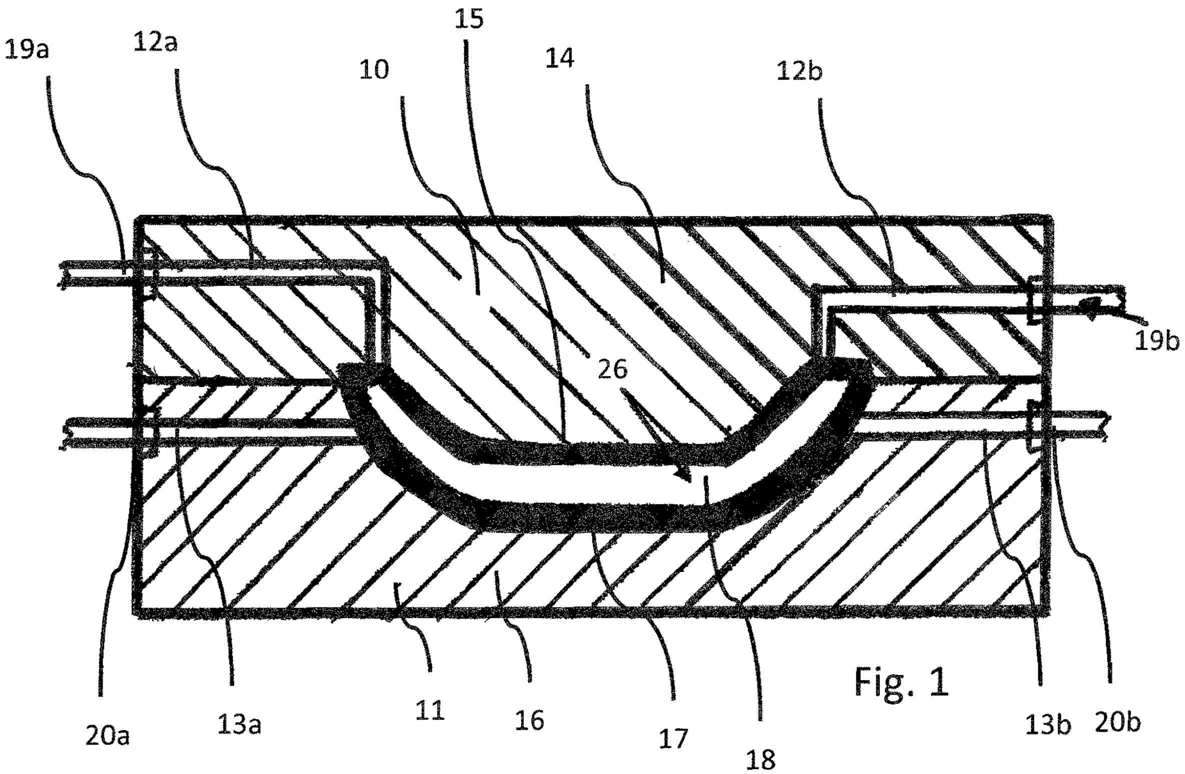
FIG. 1 shows a schematic representation of a comparison example of a slip casting mold.

FIG. 1 shows a comparison example for a slip casting mold in a schematic section. The slip casting mold comprises a first mold part 10 and a second mold part 11. Between the mold parts 10, 11 there is slurry 26 for the production of a die-cast part. In the first mold part 10 two first dewatering channels 12*a*, 12*b* are provided. In the second mold part 11, two second dewatering channels 13*a*, 13*b* are provided.

The first dewatering channels 12*a*, 12*b* are arranged in a first base body 14 of the first mold part 10. Furthermore, the first mold part 10 has a first filtration layer 15. Similarly, the second mold part 11 comprises a second base body 16 and a second filtration layer 17. To produce a (ceramic) cast part, the slurry 26 is introduced into a cavity 18 between the first mold part and the second mold part 11. The slurry is pressurized so that water is pressed out of the slurry and can be discharged via the filtration layers 15, 17 or the dewatering channels 12*a*, 12*b*, 13*a*, 13*b*. This results in a so-called body (green compact). For the demolding of the body, the mold parts 10, 11 must be opened (i.e. removed from each other) so that the body can be removed. The mold parts 10, 11 can then be cleaned (usually with water and/or air). The mold parts 10, 11 can be closed again so that a new casting cycle can start.

According to FIG. 1, the filtration water (i.e. the water pressed out of the slurry) is thus discharged (individually) by the two mold parts 10 and 11. For this purpose, 10 first connections 19*a*, 19*b* are provided on the first mold part and 11 second connections 20*a* and 20*b* on the second mold part. Hoses (or similar lines) are then usually connected to these connections, through which the water can be discharged. Such (flexible) lines can compensate a relative stroke between the first and second mold part (e.g. during product removal or cleaning, etc.).

Figure 2:
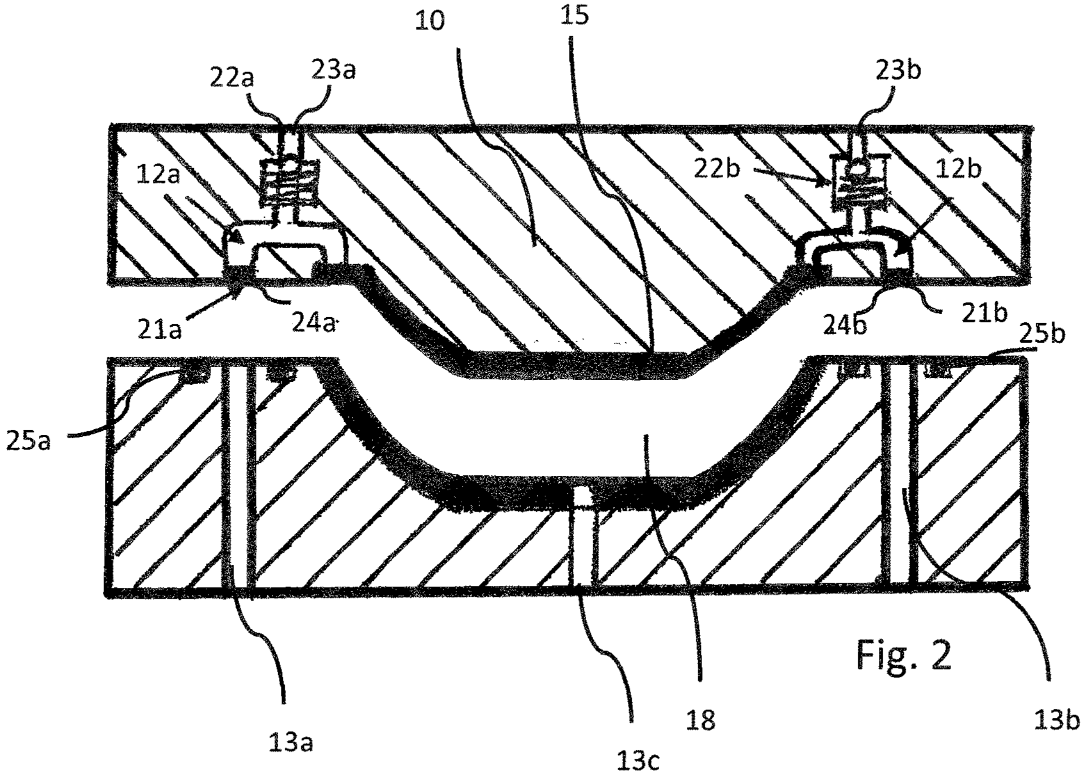
FIG. 2 shows a schematic representation of a slip casting mold according to a first embodiment of the invention.

FIG. 2 shows in a schematic section a first design of a slip casting mold according to the invention.

In this case, the first mold part 10 has first dewatering channels 12*a*, 12*b*, each having a dewatering channel end 21*a*, 21*b*, each of which (in the first mold part 10 and the second mold part 11, as are shown pressed against each other in FIG. 1) are connected in the casting position (directly) to second dewatering channels 22*a*, 22*b*, so that pressed-out water (filtration water) can be discharged from the first filtration layer 15 via the first dewatering channels 21*a*, 21*b* and the second dewatering channels 13*a*, 13*b*. Thus it is not necessary to connect a hose or the like to the dewatering channel ends 21*a*, 21*b* (which is not even possible in the casting position), but the water is discharged via the second mold part. The first mold part 10 can thus be lifted together with the body (green compact) comparatively easily and flexibly (especially via a robot) and flexibly positioned elsewhere. In summary, the water thus flows from the slurry in cavity 18 via the first filtration layer 15 into the first dewatering channels 12*a*, 12*b* and can be discharged from this via the second dewatering channels 13*a*, 13*b*.

As soon as the green compact is completely cast (in particular in a die casting process for producing a ceramic product) the first mold part 10 can be lifted with the aid of a removal device (of a robot; in particular together with the green compact).

It is preferable for this purpose to apply a vacuum (negative pressure) to the first mold part 10 so that the green compact adheres to the first mold 10 and can be moved with it. For this purpose, a robot or other removal device can open (press open) a valve 22*a* or 22*b* so that a fluid connection is realized between the first filtration layer 15 and a fluid supply and/or discharge end 23*a* or 23*b* and from there a negative pressure can be applied. In addition, a positive pressure can then be applied to position the green compact in another way (or place it on a shelf), so that the green compact detaches itself from the first mold part 10. Furthermore, water and/or air can also be introduced or extracted via the fluid supply and/or discharge ends 23*a* or 23*b* (e.g. for cleaning). A dewatering channel end filtration layer 24*a* or 24*b* in the first dewatering channel 12*a* or 12*b* ensures that fluid, which, for example, is present via the fluid supply and/or discharge end 23*a* or 23*b* and is to be conveyed in the direction of the filtration layer 15, does not (exclusively) drain via the first dewatering channel end 21*a* or 21*b*.

Furthermore, an (at least slight) positive pressure or negative pressure can be built up (in the first dewatering channels 12*a*, 12*b* and/or second dewatering channels 13*a*, 13*b*) (in particular for a better discharge of the filtration water in the casting process, in which the mold parts 10, 11 are closed). For example, it would be conceivable that a positive pressure would be built up in the second dewatering channel 13*a* and a negative pressure in the second dewatering channel 13*b* so that the total filtration water would be conveyed in the direction of the second dewatering channel 13*b*.

A second dewatering channel 13*c* (centered in FIG. 2) is in contact with the second filtration layer 17. This dewatering channel can define a slurry connection. Furthermore, the dewatering channel 13*c* can also be arranged at a different location. The second dewatering channels 13*a* and 13*b* are not connected to the second filtration layer 17 (and also not to the first filtration layer 15).

Seals 25*a*, 25*b* are arranged around the dewatering channel ends 21*a*, 21*b* to allow effective transfer of water from the first dewatering channels 12*a*, 12*b* to the second dewatering channels 13*a*, 13*b*.

Figure 3:
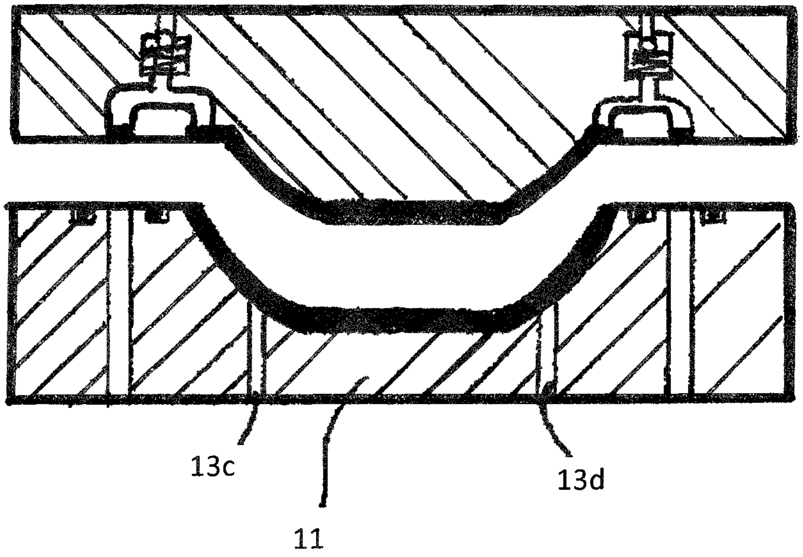
FIG. 3 shows a schematic representation of a slip casting mold according to a second embodiment of the invention.

In principle, two or more second dewatering channels can also be provided, which are in contact with the second filtration layer. An example is shown in FIG. 3, which shows a second embodiment example corresponding to the first embodiment example with the difference that two second dewatering channels 13*c*, 13*d* are provided, which are in contact with the second filtration layer 17.

At this point, it should be noted that all the parts described above are considered to be essential to the invention, as seen on their own and in any combination, in particular the details depicted in the drawings. The person skilled in the art is familiar with modifications made thereto.

LIST OF REFERENCE NUMERALS

10 First mold part
11 Second mold part
12*a*, 12*b* First dewatering channel
13*a*, 13*b*, 13*c*, 13*d* Second dewatering channel
14 First base body
15 First filtration layer

16 Second base body
17 Second filtration layer
18 Cavity
19*a*, 19*b* Connection
20*a*, 20*b* Connection
21*a*, 21*b* Dewatering channel end
22*a*, 22*b* Valve
23*a*, 23*b* Fluid supply and/or discharge end
24*a*, 24*b* Dewatering channel end filtration layer
25*a*, 25*b* Seal
26 Slurry

What is claimed is:

1. A slip casting mold, for producing a ceramic die-cast part, comprising:
at least one first mold part having a first base body and a first filtration layer, and
at least one second mold part having a second base body and a second filtration layer,
wherein at least one first dewatering channel is provided in the first base body having at least one dewatering channel end, which, in a casting position, opens into a second dewatering channel within the second base body of the second mold part, for discharging liquid out of a cavity between the first mold part and the second mold part, and wherein the first dewatering channel adjoins the first filtration layer without penetrating it.

2. The slip casting mold according to claim 1, wherein a dewatering channel end filter layer, and/or a dewatering channel end valve device is provided at the dewatering channel end.

3. The slip casting mold according to claim 1, wherein the first dewatering channel has at least one fluid supply and/or discharge end, via which air or water can be supplied and/or discharged.

4. A slip casting device, comprising at least one slip casting mold according to claim 1 for producing a ceramic die-cast part.

5. The slip casting device according to claim 4, wherein the slip casting device is configured to remove the first mold part together with the cast part from the second mold part.

6. The slip casting device according to claim 4 wherein at least one fluid supply and/or discharge device is provided in order to press air or water in the direction of a mold cavity or to suck it off from there.

7. A method for dewatering a ceramic die-cast part, in a casting mold, according to claim 1, wherein the casting mold comprises at least a first mold part having a first base body and a first filtration layer and at least a second mold part having a second base body and a second filtration layer,
the method comprising discharging liquid out of a cavity between the first mold part and the second mold part through a first dewatering channel of the first base body and from there through a second dewatering channel of the second base body.

8. The method according to claim 7, wherein first and second mold parts are pressed against each other during dewatering.

9. The method according to claim 7, wherein during dewatering, a negative or positive pressure is built up in at least one first dewatering channel of the first mold part and/or during dewatering, a negative or positive pressure is built up in at least one second dewatering channel of the second mold part.

10. A method for producing a ceramic die-cast part, using a casting mold, said casting mold comprising: at least one first mold part having a first base body and a first filtration layer, and
at least one second mold part having a second base body and a second filtration layer,
wherein at least one first dewatering channel is provided in the first base body having at least one dewatering channel end, which, in a casting position, opens into a second dewatering channel within the second main body of the second mold part, for discharging liquid out of a cavity between the first mold part and the second mold part, the method comprising the steps:
filling a mass to be cast into a cavity;
dewatering according to claim 7, and
removing the cast part from the mold.

11. The method according to claim 10, wherein the cast part is removed laterally.

12. The slip casting mold according to claim 3, wherein the fluid supply and/or discharge end is assigned a valve, so that a flow path can be opened or closed in the direction of the first filtration layer and/or in the direction of the dewatering channel.

13. The method according to claim 10, wherein the first mold part is removed together with the cast part from the second mold part.

* * * * *